(12) United States Patent
Nelson et al.

(10) Patent No.: US 10,114,370 B2
(45) Date of Patent: *Oct. 30, 2018

(54) MACHINE AUTOMATION SYSTEM WITH AUTONOMY ELECTRONIC CONTROL MODULE

(71) Applicant: Caterpillar Inc., Peoria, IL (US)

(72) Inventors: Anthony Keith Nathan Nelson, Burnie (AU); Shane A. May, Devonport (AU); Suneel Venkata Kandula, Melbourne (AU)

(73) Assignee: Caterpillar Inc., Deerfield, IL (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/357,446

(22) Filed: Nov. 21, 2016

(65) Prior Publication Data

US 2018/0143625 A1    May 24, 2018

(51) Int. Cl.
| | |
|---|---|
| *E02F 9/00* | (2006.01) |
| *G05D 1/00* | (2006.01) |
| *E02F 5/00* | (2006.01) |
| *E02F 9/26* | (2006.01) |
| *G05B 19/042* | (2006.01) |
| *G05B 19/409* | (2006.01) |

(Continued)

(52) U.S. Cl.
CPC ............ *G05D 1/0022* (2013.01); *E02F 5/00* (2013.01); *E02F 9/00* (2013.01); *E02F 9/26* (2013.01); *G05B 19/042* (2013.01); *G05B 19/409* (2013.01); *E02F 3/28* (2013.01); *G05B 2219/45004* (2013.01); *G05D 2201/0202* (2013.01); *H04B 1/38* (2013.01); *H04L 12/28* (2013.01)

(58) Field of Classification Search
CPC .......................... G05D 1/0038; G05D 1/0016
See application file for complete search history.

(56) References Cited

U.S. PATENT DOCUMENTS

| | | | |
|---|---|---|---|
| 6,633,800 B1 | 10/2003 | Ward et al. | |
| 6,778,097 B1 * | 8/2004 | Kajita | E02F 3/437 340/12.5 |

(Continued)

FOREIGN PATENT DOCUMENTS

| | | |
|---|---|---|
| CA | 2333781 A1 | 7/2002 |
| CN | 203440862 U | 2/2014 |
| CN | 103422528 B | 4/2015 |

*Primary Examiner* — Jess Whittington
(74) *Attorney, Agent, or Firm* — Miller, Matthias & Hull

(57) ABSTRACT

A Machine Automation System (MAS) for a machine with an implement includes a plurality of Vehicle Electronic Control Modules (ECMs), a local transceiver, an Ethernet Local Area Network (LAN), a first Controller Area Network (CAN), an Autonomy Electronic Control Module (AECM), an environment monitoring system, and a Remote Shutdown Module (RSM). The AECM is configured to generate output control signals, and to transmit the output control signals to at least one ECM of the plurality of Vehicle ECMs, wherein the output control signals control an operation of the machine. The RSM is disposed on the machine and configured to receive a safety control signal from off-board the machine. The MAS is configured to operate advanced machine control features concurrently with execution of the input control signals received from off-board the machine.

19 Claims, 4 Drawing Sheets

(51) Int. Cl.
  *E02F 3/28* (2006.01)
  *H04B 1/38* (2015.01)
  *H04L 12/28* (2006.01)

(56) References Cited

U.S. PATENT DOCUMENTS

| | | | |
|---|---|---|---|
| 8,918,230 B2 | 12/2014 | Chen et al. | |
| 9,098,753 B1* | 8/2015 | Zhu | G06K 9/00805 |
| 9,110,468 B2* | 8/2015 | Funke | G07C 3/00 |
| 9,213,331 B2* | 12/2015 | Johnson | E02F 9/205 |
| 9,213,333 B2* | 12/2015 | Harrison | G05D 1/0016 |
| 2010/0060487 A1* | 3/2010 | Augst | G06K 9/2036 |
| | | | 340/937 |
| 2010/0312434 A1* | 12/2010 | Schutyser | B60W 10/18 |
| | | | 701/42 |
| 2014/0207535 A1* | 7/2014 | Stefan | G05D 1/0022 |
| | | | 705/7.42 |
| 2015/0198936 A1* | 7/2015 | McGee | H04W 88/00 |
| | | | 700/40 |
| 2017/0121938 A1* | 5/2017 | Yamada | E02F 9/20 |

\* cited by examiner

MACHINE AUTOMATION SYSTEM WITH AUTONOMY ELECTRONIC CONTROL MODULE

TECHNICAL FIELD

The present disclosure relates generally to remote control of a machine and, more particularly, relates to a remote operation of machines used in mining, earth moving, or the like.

BACKGROUND

Many machines used in the earth-moving, construction, mining, and agricultural industries operate in challenging environments. For example, some mining machines operate in underground mines where the environment may be more challenging due to low tunnel clearances and ground stability concerns surrounding the immediate area. In recent efforts to improve safety at such worksite environments, trends have been to reduce the number of on-site operators at these worksites by implementing machines that are remotely controlled from a remote operator station (ROS).

For machines employed at the physical worksite, the ROS may be positioned remote from the machine at a safer location at or near the worksite or may be away from the worksite. For example, the ROS may be positioned indoors in an office environment.

U.S. Pat. No. 6,633,800 (the '800 patent) discloses an apparatus and method for a control unit that allows for autonomous, manual and tele-operation of mining vehicles. The control unit allow a tele-operator, in a remote tele-operator station, to use image and operational data, joysticks and foot pedals to remotely control the mining vehicle. While beneficial, a better control system is needed.

SUMMARY

In accordance with an aspect of the disclosure, a MAS for a machine that includes an implement is provided. The MAS may comprise a plurality of Vehicle ECMs disposed on the machine, a local transceiver disposed on the machine and configured to receive input control signals from off-board the machine, an Ethernet LAN disposed on the machine, a first CAN disposed on the machine, the AECM, the environment monitoring system, and the RSM. In an embodiment, the local transceiver is a wireless radio. In an embodiment, the Ethernet LAN may be configured to enable operative communication between an AECM, at least some of the Vehicle ECMs, an RSM, an environment monitoring system and the local transceiver. The Ethernet LAN may include a plurality of communication channels configured to transfer data between two points, a local router disposed on the machine and in operable communication with the local transceiver, a first switch, the RSM and a second switch. The local router may be in operable communication with the AECM and the environment monitoring system via the first switch. The local router may be in operable communication with at least one Vehicle ECM via the second switch. The local router may be configured to receive and transmit the input control signals from the local transceiver to the AECM. The first switch may be in operable communication with the AECM and the environment monitoring system. The second switch may be in operable communication with at least one vehicle ECM. The AECM is disposed on the machine. The AECM and at least one of the Vehicle ECMs is in operative communication via the first CAN. The AECM is configured to receive the input control signals from the local router, generate output control signals based on the input control signals, and transmit the output control signals to at least one of the Vehicle ECMs, wherein the output control signals control an operation of the machine. In an embodiment, the environment monitoring system may include a plurality of IP cameras, a microphone and a plurality of LADARS disposed on the machine. Each IP camera may be configured to transmit video data in a video stream to the local transceiver via the first switch and the router. The microphone may be configured to capture audio data, and the LADARS may be configured to transmit positioning data of the machine to the local transceiver via the first switch and the router. The video stream from one of the IP cameras may include the audio data captured by the microphone. The RSM is disposed on the machine and configured to receive a safety control signal from off-board the machine. The MAS is configured to operate advance machine control features concurrently with execution of the input control signals received from off-board the machine.

In accordance with another aspect of the disclosure, a method of controlling the operation of a machine that includes an implement is provided. The method may comprise receiving, by a local transceiver, an input control signal from off-board the machine, transmitting over an Ethernet LAN, by the local transceiver, to a local router the input control signal, transmitting over the Ethernet LAN, by the local router, to an AECM the input control signal, processing, by the AECM, the input control signal and transmitting an output control signal, based on the result of the processing, to a machine ECM to control an operation of the machine. The local transceiver, the Ethernet LAN, the local router, the AECM and the machine ECM are disposed on the machine In an embodiment, the local transceiver is a wireless radio.

In accordance with yet another aspect of the disclosure, a control system for a machine that includes an implement is provided. The control system may include A control system for a machine that includes an implement, the control system comprising a MAS and an off-board system. In one embodiment, the MAS includes: a plurality of Vehicle ECMs disposed on the machine, a local transceiver disposed on the machine and configured to receive input control signals from an off-board system, the input control signals based on operator input, an Ethernet LAN disposed on the machine, a first CAN disposed on the machine, an AECM disposed on the machine, an environment monitoring system and a RSM disposed on the machine and configured to receive a safety control signal from the off-board the machine.

The Vehicle ECMs include a machine ECM, a transmission ECM, an implement ECM and an engine ECM. The Ethernet LAN may be configured to operatively connect the AECM, at least some of the plurality of Vehicle ECMs, a first display, the RSM, the environment monitoring system and the local transceiver.

The Ethernet LAN may include a plurality of communication channels, local router, a first switch and a second switch. The communication channels are configured to transfer data between two points. The local router is disposed on the machine and in operable communication with the local transceiver, the first switch, the RSM and the second switch. The local router may be in operable communication with the AECM and the environment monitoring system via the first switch. The local router may be in operable communication with the machine ECM and the first display via the second switch. The local router is configured to receive and transmit the input control signals from the local transceiver to the AECM. In an embodiment, the first switch is in operable communication with the AECM and the environment monitoring system. In an embodiment, the second switch is in operable communication with the machine ECM and the first display. The first CAN may be configured to enable operative communication between the AECM, the machine ECM, the transmission ECM, the implement ECM, the Engine ECM and the first display. The AECM may be in operable communication with the plurality of Vehicle ECMs. The AECM is configured to: receive from the local router the input control signals, the input control signals generated by a ROS ECM, generate output control signals based on the input control signals and transmit the output control signals to the machine ECM, wherein the output control signals control movement of the machine. The environment monitoring system includes a plurality of IP cameras, each IP camera configured to capture video data.

The off-board system may include first and a second input device located remote from the machine, a first interface device configured to display video data captured by at least one of the IP cameras, and the ROS ECM. The ROS ECM is disposed remotely from the machine and is in communication with the first input device and the second input device. The ROS ECM may be configured to: receive input from the first input device or the second input device and transmit the input control signals, based on the received input, to the AECM for control of the operation of the machine. The MAS is configured to operate advance machine control features on the machine concurrently with execution of the input control signals received from the ROS ECM.

These and other aspects and features of the present disclosure will be more readily understood upon reading the following detailed description when taken in conjunction with the accompanying drawings.

DESCRIPTION

Figure 1:
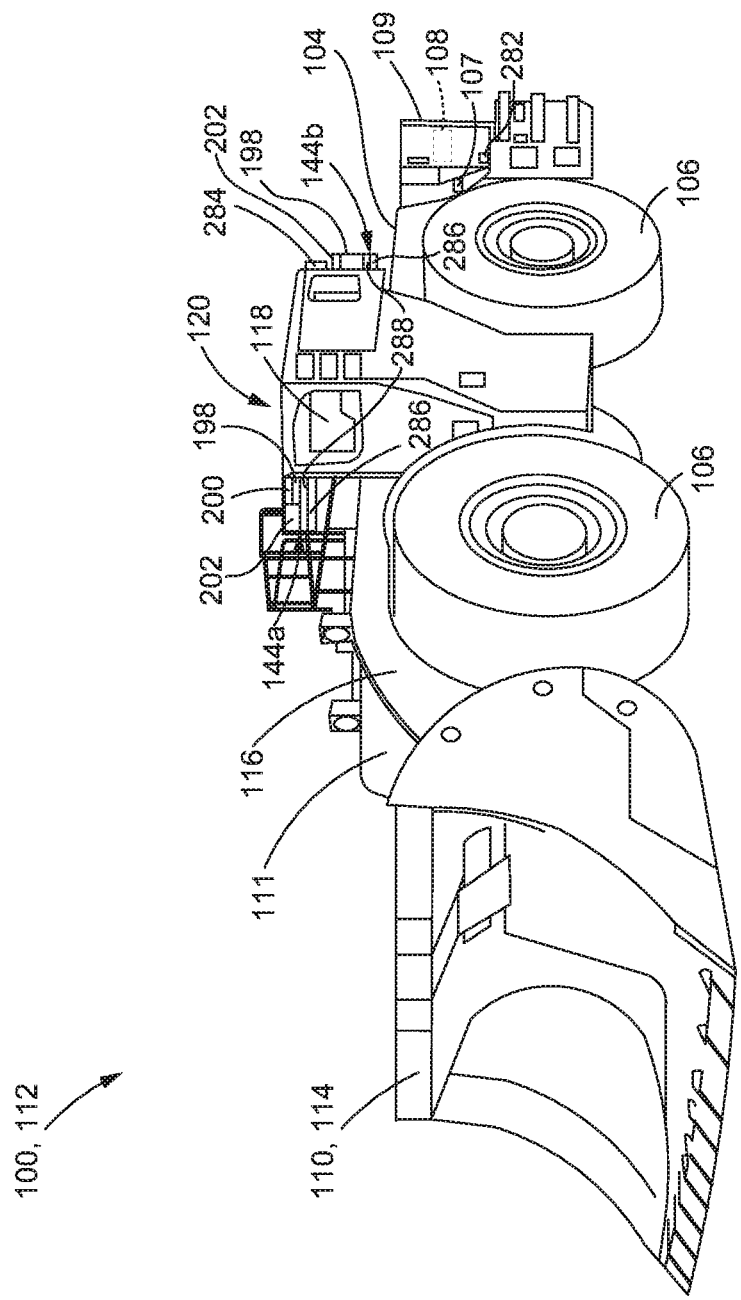
FIG. 1 is a perspective view of an exemplary embodiment of a machine with which the control system, including a Machine Automation System (MAS) and an off-board system, disclosed herein may be used.

FIG. 1 illustrates one example of a machine 100 with which the control system 102 (as seen in totality in the combination of FIGS. 2-3) of the present disclosure is utilized. The exemplary machine 100 may be, but is not limited to, an underground mining machine such as an underground load-haul-dump (LHD) loader or an underground mining truck, a backhoe loader, a skid steer loader, a wheel loader, a material loader, a motor grader, a track-type tractor, a landfill compactor, an excavator, or an articulated truck, to name a few types of machines which are employed at a worksite.

The exemplary machine 100 may include a body frame 104. The exemplary machine 100 may be supported on the ground by a plurality of wheels 106 (or track assemblies or the like). One of ordinary skill in the art will appreciate that an engine 108 may provide power to the wheels 106 via a transmission 107 and a mechanical or electric drive drain. The end of the body frame 104 in which the engine 108 is disposed may be referred to as the Engine End Frame (EEF) 109. The opposite end of the body frame 104 may be referred to as the Non-Engine End Frame (NEEF) 111. The machine 100 may include an implement 110. While the following detailed description and drawings are made with reference to exemplary machine 100 that is an underground LHD loader 112 having an implement 110 that is a bucket 114, which is mounted to the body frame 104 by a pair of lift arms 116, the teachings of this disclosure may be employed on other machines 100.

The exemplary machine 100 may be operated in one or more of the following modes: (1) manually by an operator disposed in a cab 118 on the machine 100 ("manual mode"); (2) remotely by an operator using video, audio or other positioning and machine-related information to guide and control the machine 100 ("teleremote mode"); (3) remotely by an operator using a mobile (e.g., handheld) remote control device within line of sight (LOS) of the machine ("LOS mode") for LOS control of the machine 100; (4) semi-autonomously by a remote operator using video, audio or other positioning information and machine information to guide the machine 100 as well as utilizing autonomous control for selected functions/operations of the machine 100 ("semi-autonomous mode"); or (5) autonomously by a computer or computer system ("autonomous mode").

The control system 102 (FIGS. 2-3) disclosed herein includes a Machine Automation System (MAS) 120 disposed on the machine 100 and an off-board system 122. The MAS 120 (FIG. 2) includes a plurality of Vehicle Electronic Control Modules (ECM)s 124, a local transceiver 126, an Ethernet Local Area Network (LAN) 128, a first Controller Area Network (CAN) 130, a second CAN 132, an Autonomy Electronic Control Module (AECM) 134, an environment monitoring system 136, a Remote Shutdown Module (RSM) 138 and a service port 140. The MAS 120 may also include a data link (DL) 142. The MAS 120 may include one or more machine strobe light assemblies 144 disposed on the machine 100, an indicator light 284 and an autonomous control switch 282. The MAS 120 may also include a first display 146, a vehicle health and utilization system (VHUS) 148 a positioning system 150, a first inertial monitoring unit (IMU) 154, a second IMU 156, a keypad 158 and one or more line of sight (LOS) transceivers 160. In some embodiments, the MAS 120 may also include a Tire Monitoring System (TMS) transceiver 218.

Figure 2:
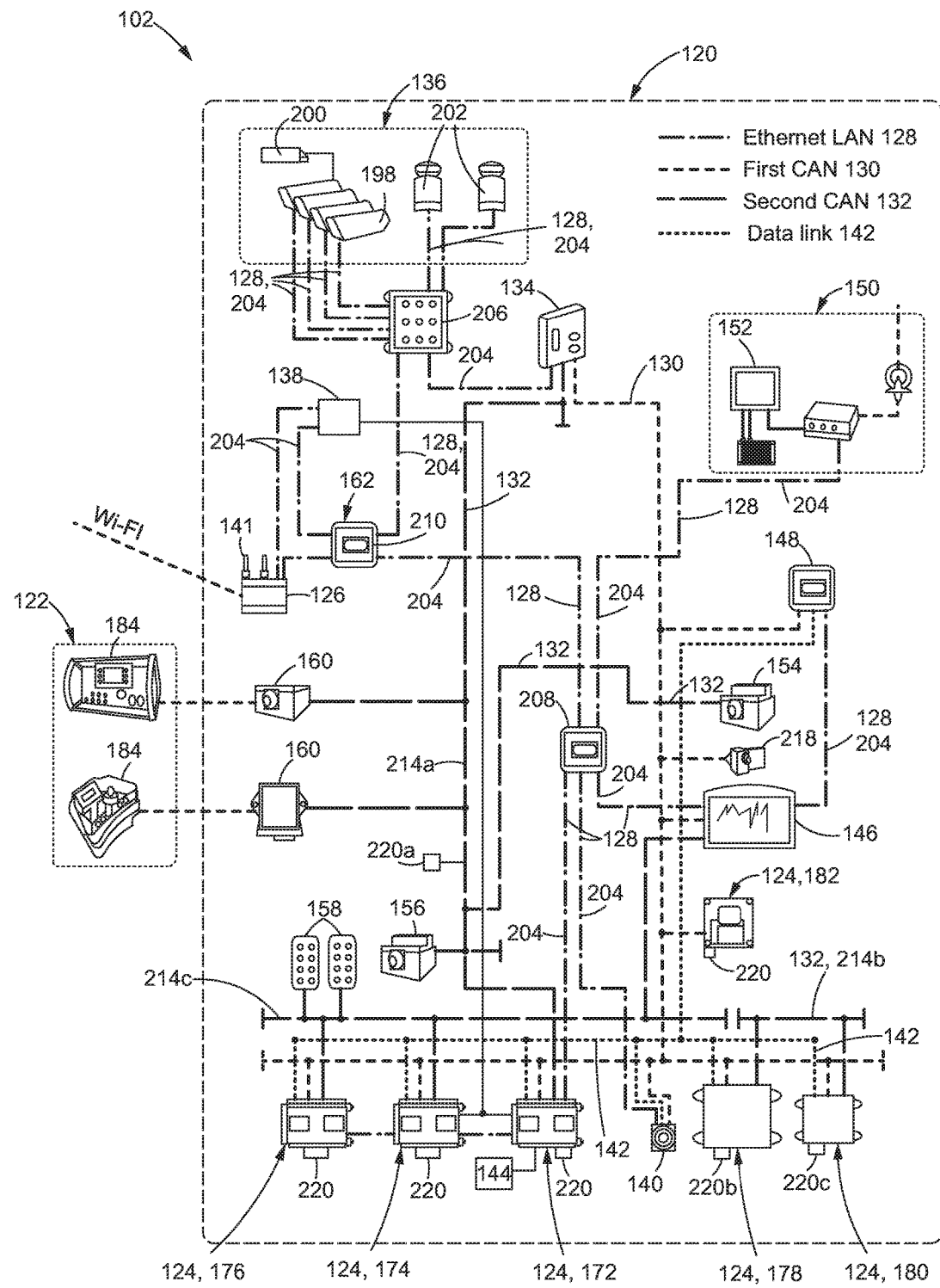
FIG. 2 is a schematic of the MAS, in accordance with an embodiment of the present disclosure.

The off-board system 122 (primarily, FIG. 3) may include a ROS 164, an Area Isolation System (AIS) Monitoring System 166, an off-board transceiver 168, an off-board Local Area Network ("Off-board LAN") 170 and one or more LOS operator consoles 184 (see FIG. 2).

Each Vehicle ECM 124 is disposed on the machine 100. The Vehicle ECMs 124 include a machine ECM 172, a transmission ECM 174, an implement ECM 176 and an engine ECM 178. The Vehicle ECMs 124 may include an aftertreatment ECM 180 and a Heating Ventilation and Air Conditioning (HVAC) ECM 182.

The machine ECM 172 includes a processor 188a (FIG. 4), which may be implemented by one or more microprocessors or other processors well-known in the art. The processor 188a includes a local memory 190a and is in communication with a read-only memory 192a and a random access memory 194a via a bus 196a. The random access memory 194a may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 192a may be implemented by a hard drive, flash memory and/or any other desired type of memory device. The processor 188a is configured to execute machine-readable instructions and to generate (output) control signals, based on received (input) control signals, to control movement of the machine 100 and/or operation of the transmission ECM 174 (e.g., traction control, ride control, power management, braking, throttling), to control operation of the implement ECM 176, to actuate one or more horns, indicators (e.g., parking brake indicator) or the like disposed on the machine 100, and to control illumination of the one or more machine strobe light assemblies 144 mounted on the machine 100. Such machine-readable instructions may be read into or incorporated into a machine-readable medium such as, for example, the local memory 190a. In alternative embodiments, hard wired circuitry may be used in place of, or in combination with, machine-readable instructions to implement a control method for the machine 100.

The (input) control signals to the machine ECM 172 may be received from the LOS operator console 184 (via the (on-board) LOS transceiver 160 and the second CAN 132), or the AECM 134 (FIG. 2). In addition, a safety control signal may be received by the machine ECM 172 from the RSM 138, as explained later herein. The control signals received from the AECM 134 are based on control signals output by the ROS ECM 186 (FIG. 3), transmitted from the off-board-transceiver 168 to the local transceiver 126 (FIG. 2), and then communicated to the AECM 134 via the local router 162, first switch 206 and Ethernet LAN 128. The machine ECM 172 is also configured to transmit data, including control feedback, to the AECM 134 via the Ethernet LAN 128, the first CAN 130 or the second CAN 132.

The term "machine-readable medium" as used herein refers to any non-transitory medium or combination of media that participates in providing instructions to the processor 188a described above, or other processors 188 described hereinafter, for execution. Such a machine-readable medium may comprise all machine-readable media except for a transitory, propagating signal. Common forms of machine-readable media include any medium from which a processor 188 (FIG. 4) can read.

Figure 4:
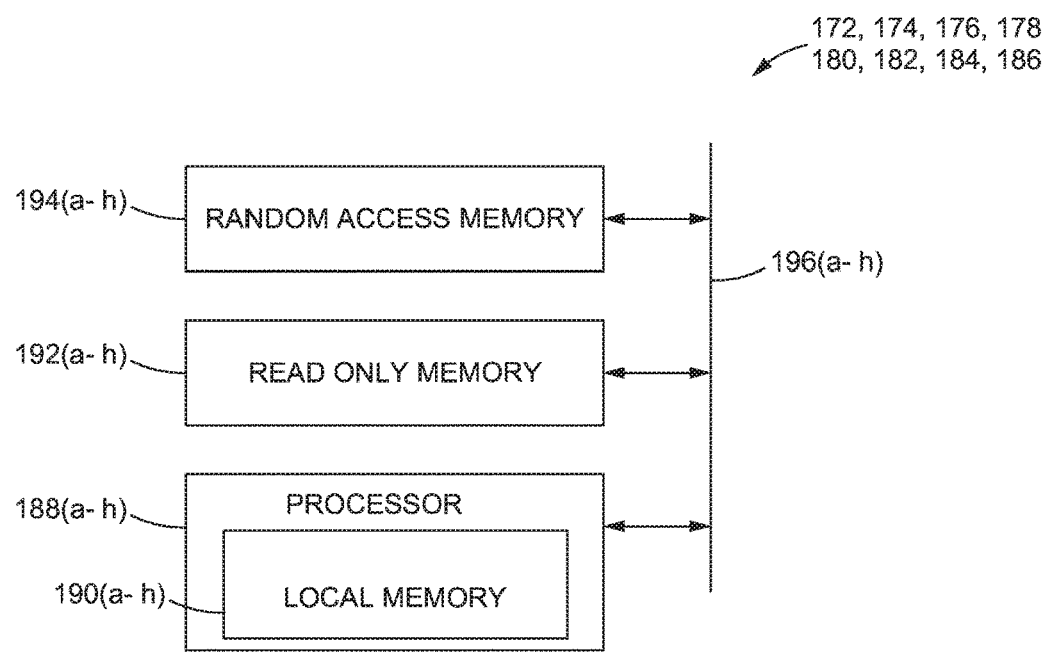
FIG. 4 is a block diagram illustrating components of an exemplary electronic control module.

The transmission ECM 174 (FIG. 2) includes a processor 188b (FIG. 4), which may be implemented by one or more microprocessors or other processors well-known in the art. The processor 188b includes a local memory 190b and is in communication with a read-only memory 192b and a random access memory 194b via a bus 196b. The random access memory 194b may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 192b may be implemented by a hard drive, flash memory and/or any other desired type of memory device. The processor 188b is configured to execute machine-readable instructions and to generate (output) control signals, based on received (input) control signals, to control operation of the transmission 107 (FIG. 1) (e.g. transmission speed, transmission mode (drive, reverse, parking brake, neutral)), and related operations. Such machine-readable instructions may be read into or incorporated into a machine-readable medium such as, for example, the local memory 190b (FIG. 4). In alternative embodiments, hard wired circuitry may be used in place of, or in combination with, machine-readable instructions to implement a control method for the machine 100 (FIG. 1).

The (input) control signals may be received by the transmission ECM 174 from the LOS operator console 184 (via the (on-board) LOS transceiver 160 and the second CAN 132), or the machine ECM 172 (FIG. 2). In addition, a safety control signal may be received by the transmission ECM 174 from the RSM 138, as explained later herein. Typically, the control signals received from the machine ECM 172 are based on control signals output by the ROS ECM 186, transmitted from the off-board-transceiver 168 to the local transceiver 126, and then communicated to the AECM 134 via the local router 162, first switch 206 and Ethernet LAN 128, and then communicated to the machine ECM 172. In some embodiments, (output) control signals generated by the LOS operator console 184 may be communicated to the transmission ECM 174 via the (on-board) LOS transceiver 160 and the machine ECM 172. Control signals output by the machine ECM 172 may be communicated from the machine ECM 172 to the transmission ECM 174 via the Ethernet LAN 128, the first CAN 130, the second CAN 132 or the DL 142. The transmission ECM 174 is also configured to transmit data, including control feedback, to the machine ECM 172.

The implement ECM 176 includes a processor 188c (FIG. 4), which may be implemented by one or more microprocessors or other processors well-known in the art. The processor 188c includes a local memory 190c and is in communication with a read-only memory 192c and a random access memory 194c via a bus 196c. The random access memory 194c may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 192c may be implemented by a hard drive, flash memory and/or any other desired type of memory device. The processor 188c is configured to execute machine-readable instructions and to generate (output) control signals, based on received (input) control signals, to control movement of the implement 110 (FIG. 1), steering of the machine 100 and other machine 100 functions (e.g., lifting, holding the bucket 114 to retain a current position, floating the bucket 114 to hold the bucket 114 above a defined limit, lowering the lift arms 116 with respect to the body frame 104, tilting the bucket 114, turning on/off front and rear lights, steering the machine 100). Such machine-readable instructions may be read into or incorporated into a machine-readable medium such as, for example, the local memory 190c (FIG. 4). In alternative embodiments, hard wired circuitry may be used in place of, or in combination with, machine-readable instructions to implement a control method for the machine 100.

The (input) control signals may be received by the implement ECM 176 from the LOS operator console 184 (via the (on-board) LOS transceiver 160 and the second CAN 132), or from the machine ECM 172 (FIG. 2). Typically, the control signals received from the machine ECM 172 are based on control signals output by the ROS ECM 186, transmitted from the off-board-transceiver 168 to the local transceiver 126, and then communicated to the AECM 134 via the local router 162, first switch 206 and Ethernet LAN 128, and then communicated to the machine ECM 172. In some embodiments, (output) control signals generated by the LOS operator console 184 may be communicated to the implement ECM 176 via the (on-board) LOS transceiver 160 and the machine ECM 172. Control signals may be communicated from the machine ECM 172 to the implement ECM 176 via the Ethernet LAN 128, the first CAN 130, the second CAN 132 or the DL 142. The implement ECM 176 is also configured to transmit data, including control feedback, to the machine ECM 172.

The engine ECM 178 includes a processor 188d (FIG. 4), which may be implemented by one or more microprocessors or other processors well-known in the art. The processor 188d includes a local memory 190d and is in communication with a read-only memory 192d and a random access memory 194d via a bus 196d. The random access memory 194d may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 192d may be implemented by a hard drive, flash memory and/or any other desired type of memory device. The processor 188d is configured to execute machine-readable instructions and to generate (output) control signals, based on received (input) control signals, to control operation of the engine 108 (FIG. 1) (e.g. engine speed and acceleration). Such machine-readable instructions may be read into or incorporated into a machine-readable medium such as, for example, the local memory 190d (FIG. 4). In alternative embodiments, hard wired circuitry may be used in place of, or in combination with, machine-readable instructions to implement a control method for the machine 100 (FIG. 1).

The (input) control signals may be received from the LOS operator console 184 (via the (on-board) LOS transceiver 160 and the second CAN 132), or from the machine ECM 172 (FIG. 2). Typically, the control signals received from the machine ECM 172 are based on control signals output by the ROS ECM 186, transmitted from the off-board-transceiver 168 to the local transceiver 126, and then communicated to the AECM 134 via the local router 162, first switch 206 and Ethernet LAN 128, and then communicated from the AECM 134 to the machine ECM 172. In some embodiments, (output) control signals generated by the LOS operator console 184 may be communicated to the engine ECM 178 via the (on-board) LOS transceiver 160 and the machine ECM 172. In some embodiments (e.g., the embodiment of FIG. 3) control signals may be communicated from the machine ECM 172 to the engine ECM 178 via the first CAN 130 or the DL 142. In other embodiments, the MAS 120 may be so configured that control signals may be communicated from the machine ECM 172 to the engine ECM 178 via the second CAN 132 or the Ethernet LAN 128. The engine ECM 178 is also configured to transmit data, including control feedback, to the machine ECM 172.

The aftertreatment ECM 180 includes a processor 188e (FIG. 4), which may be implemented by one or more microprocessors or other processors well-known in the art. The processor 188e includes a local memory 190e and is in communication with a read-only memory 192e and a random access memory 194e via a bus 196e. The random access memory 194e may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 192e may be implemented by a hard drive, flash memory and/or any other desired type of memory device. The processor 188e is configured to execute machine-readable instructions and to generate (output) control signals, based on received (input) control signals, to control emissions for of the machine 100 (FIG. 1). Such machine-readable instructions may be read into or incorporated into a machine-readable medium such as, for example, the local memory 190e (FIG. 4). In alternative embodiments, hard wired circuitry may be used in place of, or in combination with, machine-readable instructions to implement a control method for the machine 100 (FIG. 1).

The (input) control signals may be received from the machine ECM 172 (FIG. 2). In an embodiment (for example the embodiment of FIG. 3), control signals may be communicated from the machine ECM 172 to the aftertreatment ECM 180 via the first CAN 130 or the DL 142. In other embodiments, the MAS 120 may be configured such that control signals may be communicated from the machine ECM 172 to the aftertreatment ECM 180 via the second CAN 132 or the Ethernet LAN 128. The aftertreatment ECM 180 is also configured to transmit data, including control feedback, to the machine ECM 172.

The HVAC ECM 182 includes a processor 188f (FIG. 4), which may be implemented by one or more microprocessors or other processors well-known in the art. The processor 188f includes a local memory 190f and is in communication with a read-only memory 192f and a random access memory 194f via a bus 196f. The random access memory 194f may be implemented by Synchronous Dynamic Random Access Memory (SDRAM), Dynamic Random Access Memory (DRAM), RAMBUS Dynamic Random Access memory (RDRAM) and/or any other type of random access memory device 194f. The read-only memory 192f may be implemented by a hard drive, flash memory and/or any other desired type of memory device. The processor 188f is configured to execute machine-readable instructions and to generate (output) control signals, based on received (input) control signals, to control operation of the heating, ventilation or air conditioning for the machine 100 (FIG. 1). Such machine-readable instructions may be read into or incorporated into a machine-readable medium such as, for example, the local memory 190f (FIG. 4). In alternative embodiments, hard wired circuitry may be used in place of, or in combination with, machine-readable instructions to implement a control method for the machine 100 (FIG. 1).

The (input) control signals may be received from the LOS operator console 184 (via the (on-board) LOS transceiver 160 and the second CAN 132), or from the machine ECM 172 (FIG. 2). The control signals received from the machine ECM 172 may be based on control signals output by the ROS ECM 186, transmitted from the off-board-transceiver 168 to the local transceiver 126, and then communicated to the AECM 134 via the local router 162, first switch 206 and Ethernet LAN 128, and then communicated from the AECM 134 to the machine ECM 172. In some embodiments, (output) control signals generated by the LOS operator console 184 may be communicated to the HVAC ECM 182 via the (on-board) LOS transceiver 160 and the machine ECM 172. In some embodiments (for example, the embodiment of FIG. 3), control signals may be communicated from the machine ECM 172 to the HVAC ECM 182 via the first CAN 130. In other embodiments, the MAS 120 may be so configured that control signals may be communicated from the machine ECM 172 to the HVAC ECM 182 via the Ethernet LAN 128, the second CAN 132 or the DL 142. The HVAC ECM 182 is also configured to transmit data, including control feedback, to the machine ECM 172.

The local transceiver 126 may be disposed on the remotely operated machine 100. In one embodiment, the local transceiver 126 may be an Ethernet-compatible, wireless radio. The local transceiver 126 may include one or more antennas 141. The local transceiver 126 is in operable communication with the off-board transceiver 168, a local router 162 (discussed herein below) and the RSM 138. In one embodiment, the local transceiver 126 is in wireless communication with the off-board transceiver 168, and may be in communication with the local router 162 and the RSM 138 via the Ethernet LAN 128.

Figure 3:
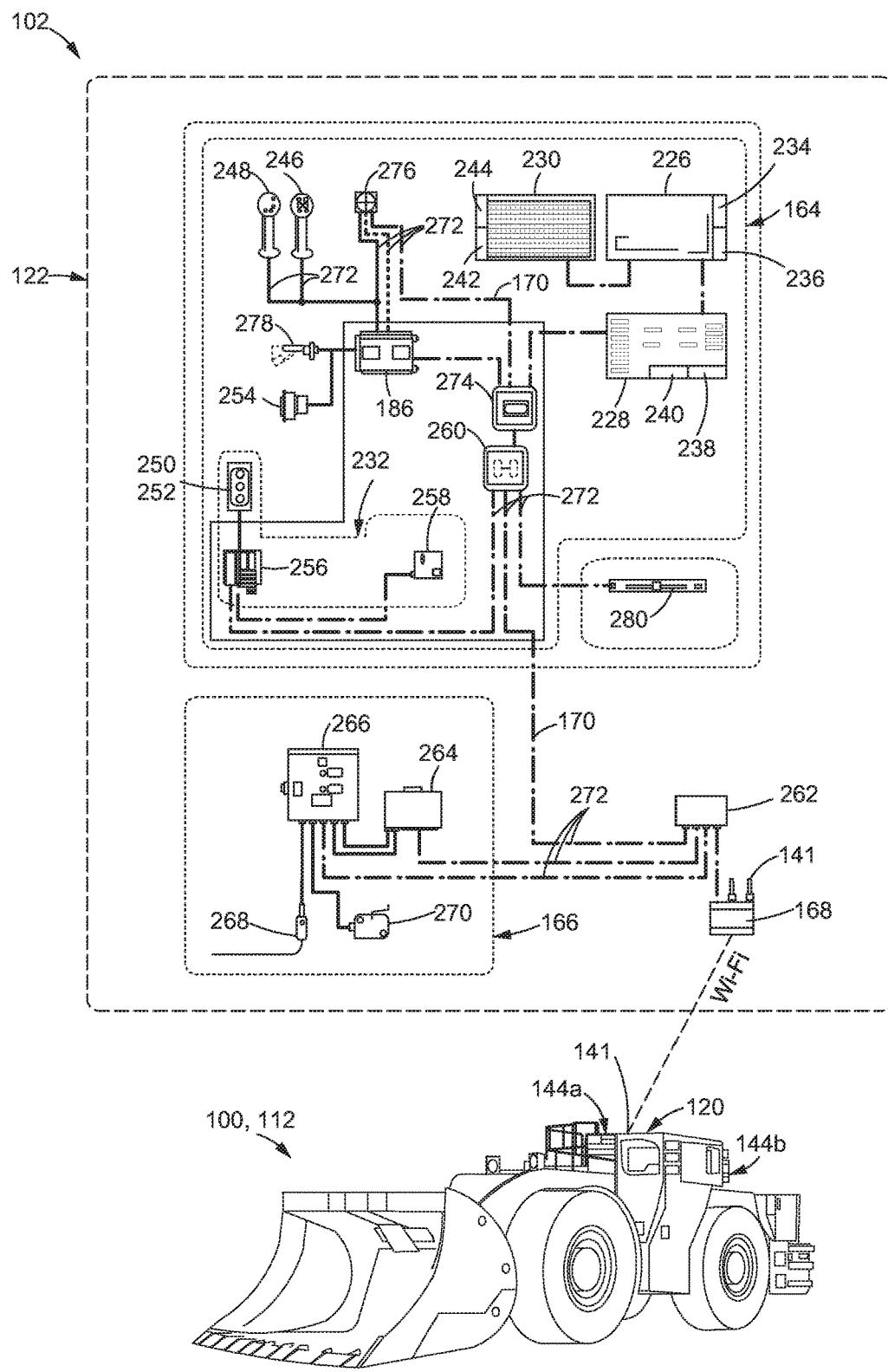
FIG. 3 is a schematic of a portion of an exemplary off-board system that includes a ROS, in accordance with an embodiment of the present disclosure.

The local transceiver 126 is configured to receive (wirelessly) control signals, safety signals and data from the off-board transceiver 168 (FIG. 3), and is configured to transmit data from the MAS 120 (FIG. 2) to the off-board transceiver 168 (FIG. 3). The received control signals may be generated by a ROS ECM 186 (based on operator input received from the second and third interface devices 228, 230 and the first and second input devices 246, 248) and may control the operation of the machine 100 (FIG. 1) and its systems (e.g., the environment monitoring system 136 (FIG. 2)). Some received control signals (for example, a safety signal) may be generated by the a machine shutdown module 264 of the AIS Monitoring System 166 (FIG. 3).

The data transmitted by the local transceiver 126 (FIG. 2) to the off-board transceiver 168 (FIG. 3) may include video data (captured by one or more IP cameras 198), audio data (captured by the microphone 200) related to the operation of the machine 100 (FIG. 1) and the work area adjacent to the machine 100, positional and distance measurement information from the LADARs 202 (FIG. 2), machine 100 operational or health related data, and other information collected and transmitted to the off-board system 122 for monitoring/logging by the ROS ECM 186 (FIG. 3), or display/replaying (e.g., video data and audio data) on, for example, the first, second or third interface devices 226, 228, 230. The video data may include video of the work area in which the machine 100 is positioned/operating.

The local transceiver 126 and the off-board transceiver 168 act as a bridge between the MAS 120 and the off-board system 122. In one embodiment, the local transceiver 126 (FIG. 2) is configured to support multiple Service Set Identifiers (SSID), thus allowing the local transceiver 126 to function on multiple subnetworks within the MAS 120. In an embodiment, the local transceiver 126 may be configured to utilize Multi-in Multi-out (MIMO) 802.11N technology, which provides improved bandwidth and signal integrity when compared to a Single-In Single-Out 802.11G radio operating in diversity mode. In such an embodiment, the antennas 141 may be, for example, dual band MIMO (2.4/5 GHZ) antennas. The local transceiver 126 is also configured to support Profinet. As is known in the art, Profinet defines the communication with field connected peripheral devices. Its basis is a cascading real-time concept. Profinet may be used to define the data exchange between controllers and devices, as well as parameter setting and diagnosis.

The Ethernet LAN 128 (FIG. 2) is disposed on the machine 100 and is configured to enable operative communication between the AECM 134, the machine ECM 172, the transmission ECM 174, the implement ECM 176, the service port 140, the first display 146, the RSM 138, the positioning system 150, the environment monitoring system 136 and the local transceiver 126. The Ethernet LAN 128 may include a plurality of communication channels 204, the local router 162, a first switch 206 and a second switch 208. In one embodiment, the Ethernet LAN 128 may operate at 100 base-T.

The local router 162 is disposed on the machine 100 and includes a local router processor 210. The local router 162 is in operable communication via communication channels 204 (of the Ethernet LAN 128) with the local transceiver 126, the first switch 206, the RSM 138 and the second switch 208. The local router 162 is also in operable communication with the AECM 134 and the environment monitoring system 136 via the first switch 206 and the communication channels 204. The local router 162 is in operable communication with the machine ECM 172, the service port 140, the first display 146 and the positioning system 150 via the second switch 208 and the communication channels 204.

The local router 162 is configured to manage data traffic on the Ethernet LAN 128 and to convert serial data to Ethernet Internet Protocol (IP)/Transmission Control Protocol (TCP) packets and vice versa. Such conversion allows serial data from third party systems to be accessed on the Ethernet LAN 128.

The local router 162 is configured to receive the control signals/safety signals, generated by either the ROS ECM 186 (FIG. 3) or the AIS Monitoring System 166, from the local transceiver 126 (FIG. 2) and to transmit such control/safety signals via the communication channels 204 to the AECM 134. The local router 162 also receives input control or safety signals from the RSM 138. The local router 162 receives data from the AECM 134 and from the environment monitoring system 136 (e.g., video data, audio data, and positional and distance measurement information) via the first switch 206. The local router 162 receives data from one or more Vehicle ECMs 124, the service port 140, the first display 146, the VHUS 148 and the positioning system 150 via the second switch 208.

The first switch 206 is disposed on the machine 100 and is in operable communication with at least the local router 162, the environment monitoring system 136 (IP cameras 198, microphone 200 and LADARs 202) and the AECM 134 via the communication channels 204 of the Ethernet LAN 128. The first switch 206 is configured to transmit and receive control signals/safety signals from the local router 162, and data from, at least, the environment monitoring system 136 and the AECM 134. The first switch 206 is configured to transmit data only to the one or more devices for which the message was intended. Furthermore, the first switch 206 has Dynamic Host Configuration Protocol (DHCP) address assignment which allows devices, for example the IP cameras 198, to be fitted or replaced without manually configuring static IP addresses. DHCP is a standardized network protocol used for dynamically distributing network configuration parameters, such as IP addresses, reducing the need for a user to configure such parameters manually. The second switch 208 is disposed on the machine 100 and is in operable communication with the machine ECM 172 via the communication channels 204 of the Ethernet LAN 128.

The plurality of communication channels 204 are configured to transfer control signals/safety control signals or data between two points, for example, between devices connected to the communication channels 204. In addition to that described above, at least one communication channel 204 is disposed between the machine ECM 172 and the transmission ECM 174 and another communication channel 204 is also disposed between the transmission ECM 174 and the implement ECM 176. The first display 146 may also be in communication with the VHUS 148 (including any associated wireless interface for the VHUS 148) via one of the communication channels 204 of the Ethernet LAN 128.

The first CAN 130 is disposed on the machine 100 and enables operative communication between the AECM 134, the machine ECM 172, the transmission ECM 174, the implement ECM 176, the service port 140, the engine ECM 178, the aftertreatment ECM 180, the first display 146, the HVAC ECM 182, the VHUS 148, and the TMS transceiver 218.

The second CAN 132 is disposed on the machine 100. The second CAN 132 includes a plurality of segments 214. The first segment 214a of the plurality enables operative communication between the AECM 134, the machine ECM 172, the LOS transceiver(s) 160, a first IMU 154 and a second IMU 156. The second segment 214b enables operative communication between the engine ECM 178 and the aftertreatment ECM 180. The third segment 214c enables operative communication between the keypad 158, the transmission ECM 174, the implement ECM 176 and the first display 146.

The DL 142 is disposed on the machine 100. The machine ECM 172, the transmission ECM 174, the implement ECM 176, the service port 140, the engine ECM 178 and the aftertreatment ECM 180, the local router 162 and the VHUS 148 are in operative communication via the DL 142.

The AECM 134 is disposed on the machine 100. The AECM 134 includes a processor 188g which may be implemented by one or more microprocessors or other processors well-known in the art. The processor 188g includes a local memory 190g and is in communication with a read-only memory 192g and a random access memory 194g via a bus 196g. The random access memory 194g may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 192g may be implemented by a hard drive, flash memory and/or any other desired type of memory device. The processor 188g is configured to execute machine-readable instructions and to generate (output) control signals, based on received (input) control signals, to control operation of the machine 100 and one or more of the Vehicle ECMs 124. Such machine-readable instructions may be read into or incorporated into a machine-readable medium such as, for example, the local memory 190g. In alternative embodiments, hard wired circuitry may be used in place of, or in combination with, machine-readable instructions to implement a control method for the machine 100.

The AECM 134 is in operable communication with the environment monitoring system 136 and the local router 162 via the first switch 206 and communication channels 204. Furthermore, as shown in FIG. 2, the AECM 134 is in operable communication with the RSM 138, the local transceiver 126, one or more Vehicle ECMs 124, the service port 140, the first display 146, the positioning system 150 and the VHUS 148 via the Ethernet LAN 128.

In addition, the AECM 134 is in operable communication with the Vehicle ECMs 124, the service port 140, the first display 146, VHUS 148 and the TMS transceiver 218 via the first CAN 130. The AECM 134 is also in operable communication with the machine ECM 124, the first IMU 154, the second IMU 156, the LOS operator console 184 and associated LOS transceiver 160, via one or more segments 214 of the second CAN 132.

The AECM 134 is configured to receive the control signals and data via the local router 162 and/or the first switch 206. The AECM 134 may also receive control signals from the service port 140. The control signals may be generated by the ROS ECM 186 (FIG. 3), the AIS Monitoring System 166 or the keypad 158.

The AECM 134 is further configured to process the control signals and data. The AECM 134 is configured to generate (output) control signals based on the processed control signals and data, and to transmit such control signals to the environment monitoring system 136, the first display 146 or one or more of the Vehicle ECMs 124, wherein the control signals control an operation of, or on, the machine 100. When such control signals are received by the Vehicle ECMs 124, such Vehicle ECMs 124 then implement the instructions/commands of the control signal from the AECM 134.

By way of explanation, the Vehicle ECMs 124 implement control signals from the AECM 134 that are based operator input to the ROS 164 but they also monitor and regulate certain functions on the machine 100. Thus, advanced machine control features, such as traction control, ride control, power control and the like, will still operate while the machine 100 (FIG. 1) is under teleremote, semi-autonomous or autonomous control by the operator and receiving control signals from the ROS ECM 186 (FIG. 3) that are based on operator input to the input devices 246, 248. For example, the AECM 134 (FIG. 2) may transmit a control signal that instructs the machine ECM 172 to apply braking. While the machine ECM 172, in response to the control signal, may actuate the brakes, the machine ECM 172 may still continue to implement power management (an advanced machine control feature). In another scenario, the AECM 134 may transmit a control signal that instructs the machine ECM 172 to steer the wheels 106 toward the right. The machine ECM 172 may generate and transmit, in response to such control signal, a control signal to the implement ECM 176 to actuate steering of the wheels 106 (by the implement ECM 176) toward the right but still continues to generate control signals that implement traction control (an advanced machine control feature) on the machine 100.

The AECM 134 may receive data from one or more Vehicle ECMs 124, the first display 146, the VHUS 148 and the positioning system 150 via the second switch 208 (the local router 162 and the first switch 206) of the Ethernet LAN 128. The AECM 134 is also configured to receive data captured by various sensors 220 disposed on the machine 100 (e.g., linear position sensors 220a, the first and second IMUs 212, 216, engine and transmission speed sensors 220b, 220c, and the like). The AECM 134 receives data (via the Ethernet LAN 128, the first CAN 130 or second CAN 132) from the linear position sensors 220a and uses such data to determine the steering articulation angle and the implement lift and tilt angle. The AECM 134 receives data from the first IMU 212 (in one embodiment, via the second CAN 130) and the second IMU 216 (in one embodiment, via the second CAN 132) and uses such data to determine acceleration and machine inclination angle. In an embodiment, the first IMU 212 may be disposed on the engine end-frame 109 and the second IMU 216 may be disposed on the non-engine end frame 111. The AECM 134 receives data from the engine and transmission speed sensors 220 (b-c) to determine engine revolutions per minute (RPM) and machine ground speed. The AECM 134 is configured to determine machine direction, implement position and machine mode. In teleremote, semi-autonomous or autonomous modes, when the remote operator is controlling the machine, the maximum available gear may be restricted. For example, the machine 100 may be limited to operation in first gear. The AECM 134 is also configured to control certain (machine 100) functions, such as ground condition monitoring, automatic steering/turning (when activated by the operator) etc. The AECM 134 is also configured to forward certain operator requests for advanced control features from the ROS ECM 186 to the appropriate Vehicle ECMs 124 (e.g., automatic dig position). When automatic dig position is requested/enabled, the depth and loading of the bucket 114 (ground engaging work tool) in a material is automatically controlled by the machine 100 in response to a productivity value. The AECM 134 may also be configured to provide data to payload type systems that analyze load times, number of passes and payload data to determine efficiency optimization. Similarly, the AECM 134 may be configured to support tire monitoring, as well.

The AECM 134 is also configured to transmit data via the local transceiver 126, including feedback information, to the ROS ECM 186. In addition, the AECM 134 is configured transfer control of the machine 100 to the LOS operator console 184 for machine recovery purposes, when the machine ECM 172 detects that signals are being received from both the AECM 134 and the LOS operator console 184, as discussed later herein.

The environment monitoring system 136, generally, determines and transmits data based on the environment in which the machine 100 operates. More specifically, as shown, the environment monitoring system 136 includes one or more internet protocol (IP) cameras 198. In an embodiment, the environment monitoring system 136 may further include the microphone 200. In another embodiment, the environment monitoring system 136 may further include one or more LADARs 202. As shown in the exemplary embodiment of FIG. 3, each of the one or more IP cameras 198, the microphone 200, and the one or more LADARs 202 are connected to the first switch 206, which may then provide data collected from such devices to be transmitted to, for example, the AECM 134, the local router 162, the local transceiver 126 and the ROS ECM 186.

The one or more IP cameras 198 are mounted on the machine 100 and allow the operator to monitor the machine 100 and its surrounding environment. The one or more IP cameras 198 are configured to provide one or more viewing perspectives from the machine 100 (e.g., a front-facing viewing perspective, a rear-facing viewing perspective, etc.). Accordingly, each of the one or more IP cameras 198 may be positioned, relative to the machine 100, to provide a specific viewing perspective. For example, a first and second of the plurality of IP cameras 198 are positioned to replicate the field of view an operator would see looking forward and rearward while in a cab 118 of the machine 100. A third IP camera may provide a view forward on the left hand side of the front of the body frame 104 to assist with tramming around corners and loading and dumping. A forth IP camera 198 may be positioned either on the right hand side of the front of body frame 104, the right hand side of the rear of the body frame 104 or as a camera that engages when the machine 100 is moving backwards (in reverse).

The IP cameras 198 are configured to generate video data associated with viewing perspectives of the machine 100. In an embodiment, the IP cameras 198 provide video data via high definition video streams that are transmitted to the first interface device 226 (FIG. 3) of the ROS 164. Each IP camera 198 (FIG. 2) is configured to transmit such video data via a video stream to the local transceiver 126 via the Ethernet LAN 128 (more specifically, the first switch 206, the local router 162 and the associated communication channels 204). The AECM 134 can determine, upon connection of an IP camera 198 to the first switch 206, the physical location in relation to the machine 100 that the IP camera 198 occupies and the IP assignment of the IP camera 198. This is accomplished via DHCP IP address assignment provided by the first switch 206. This reduces the requirement for manual configuration of each IP camera 198 and the possibility of error in the determination of positional mounting.

The microphone 200 is configured to capture audio data associated with the machine 100, and the work area adjacent to the machine 100. Such audio data may be captured by the microphone 200 and transmitted in a video stream from one of the IP cameras 198 to the local transceiver 126 via the first switch 206 and the local router 162, and then is transmitted by the local transceiver 126 to the ROS 164 (FIG. 3). The term video stream, as used herein, includes video data, and may also include audio data.

The one or more LADARs 202 (FIG. 2) are sensing devices used to determine positioning data associated with the machine 100. LADAR 202 is a radar-like remote sensing technology that measures distance by illuminating a target with a laser and analyzing the reflected light. The one or more LADARs 202 are configured to generate positioning data associated with the machine 100, which is used in guiding/operating the machine 100 in, for example, an autonomous or semi-autonomous mode (the LADARs 202 are not required for teleremote operation of the machine 100). In some examples, the one or more LADARs 202 may generate positioning data based on specific placements of the LADARs 202 on the machine 100 (similar to the IP cameras 198, the first switch 206 will assign DHCP addresses to the LADARs 202 based on their physical location on the machine 100—this reduces the need for manual configuration) or perspectives of the machine 100. The determined positioning data is transmitted to the local transceiver 126 via the first switch 206 and the local router 162 and from thereto the ROS 164 (FIG. 3).

The RSM 138 (FIG. 2) is disposed on the machine 100 and is in operative communication with the AIS Monitoring System 166 (FIG. 3). The RSM 138 is configured to receive a safety control signal from the AIS Monitoring System 166 (FIG. 3) (more specifically, the machine shutdown module 264 of the AIS Monitoring System 166) when the machine is being operated in teleremote mode, a semi-autonomous mode or an autonomous mode. The RSM 138 (FIG. 2) then sends to the machine ECM 172 and the transmission ECM 174 a control signal indicating that the safety control signal is being received. The RSM 138 also receives digital inputs from the machine ECM 172 and the transmission ECM 174 as a feedback to authenticate the reception of the control signal. If the RSM 138 ceases to receive the safety control signal from the machine shutdown module 264 of the AIS Monitoring System 166 (FIG. 3), no further control signal is sent by the RSM 138 (FIG. 2) to the machine ECM 172 and the transmission ECM 174; this results in the machine ECM 172 and the transmission ECM 174 immediately shutting down the machine 100.

The LOS transceiver 160 is disposed on the machine 100 and is in operative communication with the second CAN 132 and the (off-board) LOS operator console 184. In one embodiment, the LOS transceiver 160 is in wireless communication with the LOS operator console 184. The LOS transceiver 160 receives control signals from the LOS operator console 184 that are based on operator input entered into the LOS operator console 184. These received control signals are transmitted by the LOS transceiver 160 to one or more of the Vehicle ECMs 124 via the second CAN 132 and control the operation of the machine 100.

Each keypad 158 may be disposed on the machine 100 and is configured to receive/accept user input and to transmit control signals based on the user input, via the second CAN 132 to the AECM 134 or the appropriate Vehicle ECM 124. For example, a control signal may be sent from the keypad 158 directly to the transmission ECM 174 to activate the transmission 107 or to turn on/off a parking brake, or may be sent to the implement ECM 176 to activate the lift arms/implement or to activate high/low beam lights on the machine 100. A control signal may be sent (based on user input to the keypad 158) to the transmission ECM 174 and the machine ECM 172 that selects/deselects remote status for the machine 100.

The autonomous control switch 282 may be disposed on the machine 100 and is configured to select/deselect autonomous status for the machine 100.

By way to explanation, if remote status and autonomous status are both "off" or not selected, the machine 100 is placed in manual mode and may be operated manually by an operator in the cab 118. If remote status is selected but autonomous status is not selected, the machine 100 is placed in LOS mode and will only operate under the control of the LOS operator console 184. If remote status is not selected but autonomous status is selected, the machine 100 will not operate. If remote status and autonomous status are both "on" or selected, the machine 100 will operate in teleremote mode, semi-autonomous mode, autonomous mode or LOS mode.

An indicator light 284 may be disposed on or near the rear of the cab 118. In one embodiment, the indicator light 284 may be a green light.

On or more machine strobe light assemblies 144 (FIGS. 1-2) may be positioned on the outside of the machine 100 to indicate machine mode. In one embodiment, the machine strobe light assemblies 144 may indicate 1.) manual mode, 2.) LOS mode or 3.) teleremote/semi-autonomous/autonomous mode. In one embodiment, a machine strobe light assembly 144 may be disposed on the front of the machine 100 (the front machine strobe light assembly 144a) to provide 180° visibility when viewed from the front half of the machine 100. In such an embodiment, the front machine strobe light assembly 144a is positioned to not be visible in any IP camera 198 views. A machine strobe light assembly 144 may be disposed on the rear of the machine 100 (the rear machine strobe light assembly 144b). The rear machine strobe assembly 144b may be disposed on the machine to provide 180° visibility when viewed from the rear half of the machine 100 without being visible in any IP camera 198 views. Each of the machine strobe light assemblies 144 include a first light 286 and a second light 288, the second light 288 emitting a different colored light than the first light 286. In the exemplary embodiment described below, the first light 286 is an amber light and the second light 288 is a red light.

Each machine strobe light assembly 144 is configured to provide a visual indication of which mode (manual mode, LOS mode, teleremote/semi-autonomous/autonomous mode) the machine 100 is operating in. This involves the use of the indicator light 284, and the first light 286 (amber light) and the second light 288 (red light) of the machine strobe light assemblies 144 in various combinations. When the machine 100 (FIG. 1) is being operated in manual mode (operator in the cab 118 on the machine 100 and the remote status and autonomous status are both off), the indicator light 284 (green) and the first light 286 (amber) and the second light (red) 288 of the machine strobe light assemblies 144 are not illuminated.

When autonomous status is on/off and remote status for the machine 100 is initially selected via the keypad 158, the indicator light 284 (green) may flash (e.g., at 2 hertz) during the request for selection of remote status, the first light 286 (amber) and the second light 288 (red) (FIG. 1) are not illuminated. Once the remote status selection request is granted, the indicator light 284 (green) may flash in a pulsed fashion; the first light 286 (amber) and second light 288 (red) are not illuminated. Once the machine 100 (FIG. 1) is being run in LOS mode by an operator using the LOS operator console 184 (FIG. 3), the indicator light 284 (green) (FIG. 1) may be illuminated in a constant manner and the first light 286 (amber) and the second light 288 (red) are not illuminated.

When remote status is selected via the keypad 158 and autonomous control (semi-autonomous control or entirely autonomous control) is initially requested by an operator through selection of the autonomous state via the autonomous control switch 282, the indicator light 284 (green) flashes (e.g., at 2 hertz) and the first light 286 (amber) and the second light 288 (red) in the machine strobe light assemblies 144 flash for a period of time (for example 5 seconds). After the period of time, the second light 288 (red) will turn off, but the first light 286 (amber) and the indicator light 284 (green) remain flashing. This is indicative of the AIS Monitoring System 166 (FIG. 3) not yet transmitting a safety control signal to the RSM 138 (FIG. 2) of the MAS 120. (If the AIS Monitoring System 166 is not transmitting a safety control signal, the first light 286 (amber) (FIG. 1) is flashing and the second light 288 (red) is not illuminated.) If the AIS Monitoring System 166 is transmitting a safety signal, the second light 288 (red) flashes and the first light 286 (amber) is not illuminated. Thus, in the scenario above, when the RSM 138 (FIG. 2) receives the safety control signal, the RSM 138 will send a control signal to the machine ECM 172 so that the second light 288 (red) (FIG. 1) will flash and the amber light 145b will not be on; the indicator light 284 (green) will remain flashing. If the ROS ECM 186 does not subsequently request control of the machine 100, then the indicator light 284 (green) continues to flash (at, for example, 2 hertz). If the ROS ECM 186 does subsequently request control of the machine 100 (for the teleremote, semi-autonomous or autonomous mode), the illumination of the indicator light 284 (green) will begin pulsing. Once the machine 100 is operating under the control of the ROS ECM 186, the indicator light 284 (green) is illuminated in a constant manner.

The first display 146 (FIG. 2) is disposed on the machine 100. For example, the first display 146 may be disposed in an operator cab 118 (FIG. 1) of the machine 100. The first display 146 (FIG. 2) may receive from the AECM 134, and display, various machine fault codes, machine modes, various functions and diagnostics. For example, the first display 146 may display machine mode information and may accept operator input for transmission to the AECM 134 or the machine ECM 172. For example, the first display 146 may accept operator input that selects a strobe pattern and then transmit that input to the machine ECM 172. The first display 146 may display information indicating whether the signals from the transmission ECM 174 and the machine ECM 172 to the RSM are active, whether the autonomous status is selected/deselected by the autonomous control switch 282, whether the remote status is selected/deselected on the keypad 158, whether remote status is pending or active, whether the ROS ECM 186 or (a controller associated with) the LOS operator console 184 has reservation of the machine or whether the machine is unreserved, the current state (on, off, flashing etc.) of the indicator light 284, or the first and second lights 286, 288, the current position indicated by the steering and implement sensors 220a diagnostics on certain relays in the machine 100 and whether the power saving mode is on/off. The power saving mode turns off various components on the machine 100, including some of the Vehicle ECMs 124 and LADARs 202 to reduce battery consumption while still keeping the Ethernet LAN 128 and the RSM 138 active. In some embodiments, power saving mode can be deactivated when a machine 100 is operated in teleremote, semi-autonomous or autonomous mode.

The VHUS 148 provides detection of an impeding or abnormal condition in any of the machine's 100 systems and an operator notification to either modify operation of the machine 100, schedule maintenance, or perform a safe shutdown of the machine 100. VHUS 148 also may provide production and performance information and may record load time, travel loaded, dump time, and travel empty, along with delay times. Data from the VHUS may be transmitted to the AECM 134 and to the ROS 164 (FIG. 3).

The positioning system 150 (FIG. 2) is disposed on the machine 100. The positioning system 150, in some embodiments, may include a second display 152, and may be in operative communication with the second switch 208 via the Ethernet LAN 128. The positioning system 150 is configured communicate fleet management information such as position and other machine 100 related information to off-board fleet management systems (and the like) that provide real-time machine 100 positioning/tracking, assignment and productivity management for a fleet. The second display 152 may be in operative communication with such off-board fleet management systems, and may be configured to display tracking, assignment and productivity and other machine 100 related information.

The TMS transceiver 218 is configured to receive tire pressure and temperature data associated with each wheel 106 and to transmit such tire pressure and temperature data to the VHUS 148 and the first display 146 via the first CAN 130. The TMS transceiver 218 is also configured to transmit such tire pressure and temperature data to the AECM 134 via the first CAN 130. Such data is then transmitted from the AECM 134 to the ROS ECM 186 (FIG. 3) for display on a first and second interface 226, 228.

The ROS 164 (FIG. 3) is configured to remotely operate one or more machines 100 employed at a worksite. The ROS 164 is remotely located from the machines 100. In some embodiments, the ROS 164 may be disposed at a location underground (but outside of the work area of the machine 100). In other embodiments, the ROS 164 may be located near or above the surface of the mine. The ROS 164 enables the operator to control the machine 100 (FIG. 1) functions as if the operator was in the cab 118 disposed on the controlled machine 100. For example, the operator can remotely control functions such as the speed and direction (forward/reverse), steering, implement controls, lights and horn.

Figure 5:
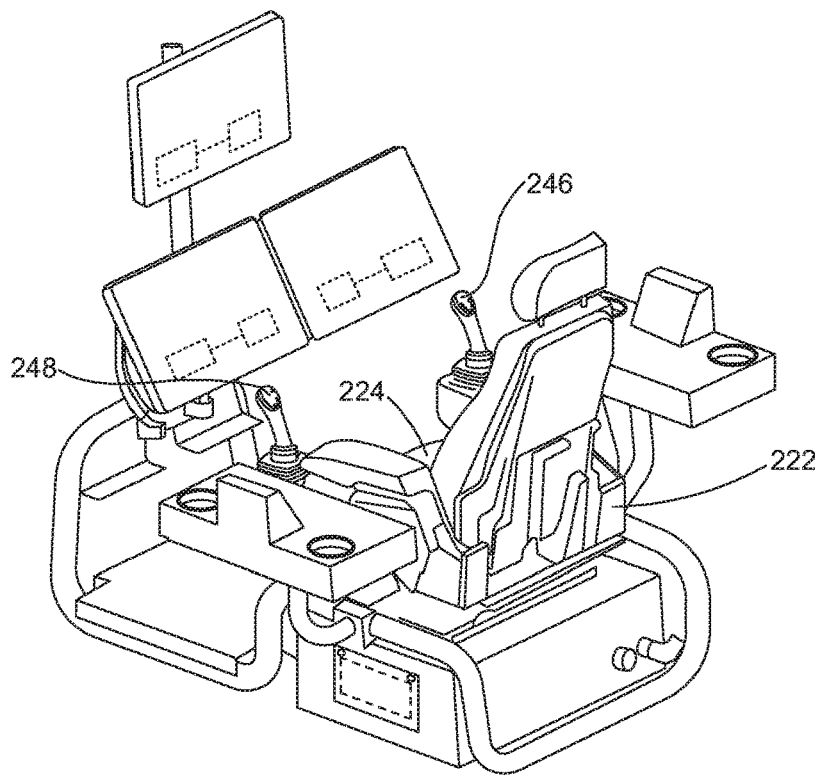
FIG. 5 is a perspective view of an embodiment of the ROS of FIG. 3.

The ROS 164 includes a frame 222 (FIG. 5) and a seat 224 configured to receive an operator. The ROS 164 further includes the ROS ECM 186 (FIG. 3), a first interface device 226, a second interface device 228, and an AIS 232. In some embodiments, the ROS 164 may further include a third interface device 230 and/or a fire suppression switch 254.

The first interface device 226 includes a first interface processor 234 and a first interface memory 236 in communication with the first interface processor 234. In an embodiment, the first interface device 226 may be a touch-based display interface configured to receive touch-based input from an operator's bare or gloved finger and/or a conductive stylus. The first interface processor 234 may be implemented by one or more microprocessors or other processors well-known in the art. The first interface processor 234 may execute machine-readable instructions to receive, and display on the first interface device 226, real-time situational awareness features of the machine 100 such as, but not limited to, speed, fuel level, engine temperature, and gage levels, and live video received from the IP camera(s) 198. The machine-readable instructions may be read into or incorporated into a computer-readable medium, such as the first interface memory 236. In alternative embodiments, hard wired circuitry may be used in place of, or in combination with, machine-readable instructions. The video is based on the video data captured by the IP cameras 198 and transmitted to the first interface device 226 from the local transceiver 126. The first interface device 226 is configured to display the output of one of the camera views in full resolution at any time. The resolution of the other views may be downscaled to reduce data on the Ethernet LAN 128 (FIG. 2) and Off-board LAN 170 (FIG. 3). The ROS ECM 186 will automatically select for display the output of one of the forward or reverse IP cameras 198, depending on the direction the machine 100 is travelling in; the operator can manually choose a different IP camera 198 (FIG. 2) output for display, if desired.

The first interface device 226 (FIG. 3) is also configured to play real-time audio captured by and received from the microphone 200 (FIG. 2) of the environment monitoring system 136. The audio is based on the audio data captured by the microphone 200 and transmitted to the first interface device 226 (FIG. 3) from the MAS 120 (FIG. 2).

The second interface device 228 (FIG. 3) includes a second interface processor 238 and a second interface memory 240 in communication with the second interface processor 238. In an embodiment, the second interface device 228 may be a robust, scratch-proof touch-based display interface configured to receive touch-based input from an operator's bare or gloved finger and/or a conductive stylus. The second interface processor 238 may be implemented by one or more microprocessors or other processors well-known in the art. The second interface processor 238 may execute machine-readable instructions to receive touch-based input from the second interface device 228 for generating control signals to remotely control non-movement features and functions of a machine such as, but not limited to, starting/stopping the engine, turning on/off lights, controlling microphone volume, controlling IP camera recording. The second interface processor 238 may execute machine-readable instructions to display on the second interface device 228, or to log, machine information received from the MAS 120. Such machine-readable instructions may be read into or incorporated into a machine-readable medium, such as the second interface memory 240. In alternative embodiments, hard wired circuitry may be used in place of, or in combination with, machine-readable instructions. The machine information may include machine diagnostics, machine health, operator notifications, measurements, information collected by the LADARs 202 (FIG. 2), information from sensors 220 (for example, ground and engine speed sensors 220b), and other data related to the operation of the machine 100. The second interface 228 (FIG. 3) displays machine health notifications if the Vehicle ECMs 124 (FIG. 2) flag an event or if detected by the VHUS 148. The second interface device 228 also displays the status of the AIS 232 (FIG. 3).

In some embodiments, the ROS 164 may be configured to control a plurality of machines 100, typically one machine 100 at a time. A separate external server 280 is not required to remotely operate multiple machines 100.

The third interface device 230 includes a third interface processor 242 and a third interface memory 244 in communication with the third interface processor 242. In an embodiment, the third interface device 230 may be a robust, scratch-proof touch-based display interface configured to receive touch-based input from an operator's bare or gloved finger and/or a conductive stylus. The third interface processor 242 may be implemented by one or more microprocessors or other processors well-known in the art. The third interface processor 242 may execute machine-readable instructions to receive, and display on the third interface device 230, fleet management information such as, but not limited to, map features illustrating machine positioning. The third interface device 230 is also configured to receive touch-based input to edit at least some of the fleet management information. The third interface processor 242 may execute machine-readable instructions for allowing the operator to the fleet management information. Such machine-readable instructions may be read into or incorporated into a computer-readable medium, such as the third interface memory 244. In alternative embodiments, hard wired circuitry may be used in place of, or in combination with, software instructions.

The first input device 246 may be a first joystick or the like, and is configured to transmit input signals to the ROS ECM 186 (FIG. 2) for processing and communicating to the machine 100, via the off-board transceiver 168 (FIG. 3), for specific operations related to an implement 110 (FIG. 1) of the machine 100 such as, but not limited to, the bucket 114. For example, movement of the first input device 246 may control operation of the implement 110 such that forward movement lowers the implement 110, backward movement raises the implement 110, leftward movement tilts the implement 110 back, and rightward movement controls the implement 110 to dump. Moreover, the first input device 246 includes a plurality of implement control buttons which, when engaged, control operations related to the implement 110 including but not limited to: initiating a next machine operation, turning on/off the autonomous mode, initiating an autonomous loading operation, initiating a next goal operation, initiating an autopilot activation operation, initiating an ejector bucket operation, initiating a bucket counter increment operation, and initiating an operation to raise engine rotations per minute (rpm).

The second input device 248 (FIG. 3) may be a second joystick or the like and is configured to transmit input signals to the ROS ECM 186 for processing and communicating to the machine 100, via an off-board transceiver 168, for specific operations related to controlling motion thereof. For example, movement of the second input device 248 controls movement and steering of the machine 100 such that forward movement propels the machine 100 in a forward direction, backward movement propels the machine 100 in a reverse direction, leftward movement turns the machine 100 left, and rightward movement turns the machine 100 right. Moreover, the second input device 248 includes a plurality of machine control buttons which, when engaged, control operations related to movement of the machine 100, including but not limited to: initiating an engine stop operation, initiating a straightening operation, switching IP camera 198 views, initiating momentary view switching on the first interface device 226 between a forward-facing IP camera 198 and a rear-facing IP camera 198, sounding a horn, and initiating transmission shifting. The first and second input devices 246, 248 may be any input devices well-known in the industry such as, but not limited to, joysticks, levers, and push-buttons.

The ROS ECM 186 may include a processor 188$h$ (FIG. 4), which may be implemented by one or more microprocessors or other processors well-known in the art. The processor 188$h$ includes a local memory 190$h$ and is in communication with a read-only memory 192$h$ and a random access memory 194$h$ via a bus 196$h$. The random access memory 194$h$ may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 192$h$ may be implemented by a hard drive, flash memory and/or any other desired type of memory device. The processor 188$h$ is configured to execute machine-readable instructions to receive input signals from the first and second input devices 246, 248 for generating control signals to remotely operate the machine 100 such as, but not limited to, machine 100 (FIG. 1) movement, implement 110 movement and implement-related functions. Such machine-readable instructions may be read into or incorporated into a computer-readable medium such as, for example, the local memory 190$h$ (FIG. 4). In alternative embodiments, hard wired circuitry may be used in place of, or in combination with, machine-readable instructions to implement a method for the machine 100.

The ROS 164 may include a fire suppression switch 254. The fire suppression switch 254 is configured to provide the worksite with a safe guard against possible fires and is in operative communication with the ROS ECM 186.

The AIS 232 (FIG. 3) includes an AIS shutdown switch 250, an AIS reset switch 252, a first AIS shutdown programmable logic controller 256 and a second AIS control programmable logic controller 258. The AIS shutdown switch 250 is configured to provide a safety feature at the worksite where the machine 100 is employed and is in operative communication with the AIS shutdown programmable logic controller 256. The AIS reset switch 252 is configured to reset the safety feature at the worksite back to operating conditions and is operatively associated with an AIS shutdown programmable logic controller 256.

The AIS shutdown switch 250 and the AIS reset switch 252, may both be in communication with the off-board router 260 via the AIS shutdown programmable logic controller 256 and the AIS control programmable logic controller 258. In this manner, the off-board router 260 is also in communication with the AIS Monitoring System 166 via the off-board network switch 262.

The AIS Monitoring System 166 ensures that the work area the machine 100 is operating in remains isolated from personnel and equipment. A pair of barriers may be set up at each entrance to the work area of the machine 100. One barrier may prevent personnel from entering the work area, the second may prevent the remotely operated, or an autonomously operated, machine 100 from escaping the work area. The AIS Monitoring System 166 may be located off-board of the machine 100 and may include an at least one machine shutdown module 264 in communication with an at least one barrier control panel 266, both of which are in communication with the off-board network switch 262. The at least one barrier control panel 266 is further in communication with a machine barrier switch 268, and a personal barrier switch 270 and barrier sensors disposed on or adjacent to barriers. The AIS Monitoring System 166 monitors signals from barrier sensors disposed adjacent to each barrier, as well as the machine barrier switches 268, and the personal barrier switches 270 at each barrier and at the ROS 164. Barrier sensors may include lights curtains, LADARs, proximity switches mounted to gates, and fixed tension switches attached to lanyard cables.

When all signals are satisfactory (e.g., at the AIS shutdown switch 250, machine barrier switches 268, personal barrier switches 270, the barrier sensors etc.), the machine shutdown module 264 transmits a safety control signal to the machine 100, more specifically to the RSM 138 that then transmits a control signal to the machine ECM 172 and the transmission ECM 174, that allows the machine 100 to operate. If a barrier sensor, machine barrier switch 268, personal barrier switch 270 or AIS shutdown switch 250 has been triggered or the signal from such is lost, the machine shutdown module 264 ceases to transmit the safety control signal to the RSM 138 and the RSM 138 ceases to transmit the control signal to the machine ECM 172 and the transmission ECM 174. The machine ECM 172 and the transmission ECM 174 immediately shut down the machine 100 if the control signal from the RSM 138 is lost or ceases.

The LOS operator console 184 (FIG. 2) is disposed off-board the machine 100 and is be configured to accept operator input, to generate control signals for the machine 100 based on the operator input and to wirelessly transmit such control signals to the LOS transceiver 160. These control signals are transmitted by the LOS transceiver 160 to the machine ECM 172 via the second CAN 132 and control the operation of the machine 100.

If both signals from the LOS operator console 184 and the AECM 134 are sensed by the machine ECM 172, the machine ECM is configured to give preference to (act upon) the signals from the LOS operator console 184. The AECM 134, in this situation, is configured to relinquish control of the machine 100 to the LOS operator console 184. This is to allow the machine 100 to be recovered from a situation/location (for example, a dangerous location) via use of the LOS operator console 184, without an operator having to approach the machine 100 to change the operation mode to the LOS mode. For example, in a scenario where the machine is operating in autonomous mode (remote status is selected and autonomous status is selected) and an urgent need arises (for example, the machine 100 moves onto unsupported ground) for the operator to take control of the machine 100, while in line of sight of the machine 100, the operator can take control of the machine via the LOS operator console 184 without having to approach the machine to deselect the autonomous status on the autonomous control switch 282 on the machine.

The off-board transceiver 168 (FIG. 3) is disposed remotely from the machine 100. In one embodiment, the off-board transceiver 168 may be an Ethernet-compatible, wireless radio. The off-board transceiver 168 may include one or more antennas 141. The off-board transceiver 168 is in operable communication with the ROS ECM 186, the first, second and third interface devices 226, 228, 230, the first and second input devices 246, 248, the AIS 232 and the AIS Monitoring System 166 via the off-board LAN 170. The off-board transceiver 168 is in wireless communication with the local transceiver 126.

The off-board transceiver 168 is configured to receive control signals from the ROS ECM 186 and to transmit such to the local transceiver 126. The received control signals may be generated by the ROS ECM 186 (based on operator input received from the second and third interface devices 226, 228, 230 and the first and second input devices 246, 248) to control the operation of the machine 100 and related systems via the AECM 134 and the Vehicle ECMs 124. The received control signals may also be generated by the AIS Monitoring System 166. The off-board transceiver 168 may receive from the local transceiver 126 data from the MAS 120 (e.g., images or video of the work area in which the machine 100 is positioned/operating captured by the IP cameras 198, audio captured by the microphone 200, and positional and distance measurement information from by the LADAR 202 related to the machine 100 and the work area adjacent to the machine 100, machine operational or health related data, and other information).

The off-board LAN 170 (FIG. 3) includes a plurality of off-board communication channels 272 that are either Ethernet or CAN, the off-board router 260 and an off-board Ethernet switch 274, the off-board transceiver 168 and the off-board network switch 262. The off-board router 260 includes a router processor and a router memory that are in operable communication with the off-board Ethernet switch 274, the off-board transceiver 168, the off-board network switch 262 via the off-board communication channels 272. The off-board router 260 is configured to receive and transmit control signals and data between these components. The off-board Ethernet switch 274 is also in communication with the ROS ECM 186, the first, second and third interface devices 226, 228, 230, and a service port 276 that is also in communication with the ROS ECM 186. The ROS ECM 186 is also in communication via the off-board LAN 170 with the first and second input devices 246, 248, the fire suppression switch 254, and a seat sensor 278 for detecting an operator in the seat 224 of the ROS 164.

In an embodiment, the seat sensor 278 (FIG. 3) is disposed integrally with the seat 224 (FIG. 5) of the ROS 164 (FIG. 3) and is configured to detect when an operator has moved out of the seat 224 such that, upon detection, the ROS ECM 186 is configured to automatically lock down the first and second input devices 246, 248; the RSM 138 may bring the machine 100 to a safe state (shut it down) as a result of the triggering of the seat sensor 278. As non-limiting examples, the seat sensor 278 can be a pressure sensor, an analog-voltage sensor, and any other well-known sensors in the art.

The off-board router 260 (FIG. 3) is in communication with the off-board network switch 262 via the off-board communication channels 272. Additionally or alternatively, the off-board router 260 may be in further communication with an external server 280 separate from the ROS 164. The external server 280 may be configured to store data and information such as, but not limited, operator login information, maps, configurations, and machine operation logs, and to allow the ROS ECM 186 and machine 100 access to such stored information. The off-board network switch 262 is further in communication with an off-board transceiver 168 configured to (wirelessly) transmit operating signals initiated from the ROS ECM 186 to the machine 100, and to wirelessly receive real-time machine characteristics from the machine 100 such as, but not limited to, speed, engine temperature, and position information, for transmission to the ROS 164.

INDUSTRIAL APPLICABILITY

In general, the present disclosure may find applicability in any number of industrial applications such as, but not limited to, mining, earth-moving, construction, and agricultural industries. The MAS 120 is configured to implement operation of a machine 100 such as, but not limited to, underground mining machines such as underground load-haul-dump loaders 112 and underground mining trucks, backhoe loaders, skid steer loaders, wheel loaders, material loaders, motor graders, track-type tractors, landfill compactors, excavators, and articulated trucks, to name a few, which are employed at a worksite. The MAS 120 implements operation of the machine in teleremote mode, semi-autonomous mode and autonomous mode.

Disclosed herein is a method of controlling the operation of a machine 100 that includes an implement 110 and a MAS 120 by utilizing control signals received by the MAS 120 from an off-board system 122. Such control signals may be generated by either the ROS ECM 186, the AIS Monitoring System 166 or the LOS operator console 184 of the off-board-system 122. In addition, the MAS 120 transmits data from the machine to the ROS 164 of the off-board system 122 for monitoring and/or processing.

The control method may comprise receiving, by the local transceiver 126 or an LOS transceiver 160 of the MAS 120 disposed on the machine 100, an input control signal from the off-board system 122. In an embodiment, the local transceiver 126 may be a wireless radio.

In embodiments in which the control signal is received by the local transceiver 126, from the off-board transceiver 168 of the off-board system 122, the method may further comprise transmitting by the local transceiver 126, over an Ethernet LAN 128, the input control signal to a local router 162 disposed on the machine 100. The method may further comprise transmitting over the Ethernet LAN 128, by the local router 162, to an AECM 134 the input control signal; processing, by the AECM 134, the input control signal; and transmitting an output control signal, based on the result of the processing, to a machine ECM 172 or other Vehicle ECM 124 to control operation of the machine 100.

Alternatively, when the control signal is received by the MAS 120 from the LOS operator console 184, the method may further comprise transmitting the (received) control signal via the second CAN 132 to one or more Vehicle ECMS 124 or the AECM 134 to control operation of the machine 100.

The teachings of this disclosure may be particularly beneficial to for operators of LHD 112 and similar machines employed in underground mines where the environment may be challenging due to low tunnel clearances and ground stability concerns surrounding the immediate area, and for operators that desire to operate advance machine control features concurrently with execution of the input control signals received from off-board the machine.

What is claimed is:

1. A Machine Automation System (MAS) for a machine that includes an implement, the MAS comprising:
a plurality of Vehicle Electronic Control Modules (ECMs) disposed on the machine;
a local transceiver disposed on the machine and configured to receive input control signals from off-board the machine, wherein the local transceiver is a wireless radio;
an Ethernet Local Area Network (LAN) disposed on the machine and configured to enable operative communication between an Autonomy Electronic Control Module (AECM), at least some ECMs of the plurality of Vehicle ECMs, a Remote Shutdown Module (RSM), an environment monitoring system and the local transceiver, the Ethernet LAN including:
a plurality of communication channels configured to transfer data between two points;
a local router disposed on the machine and in operable communication with the local transceiver, a first switch, the RSM, and a second switch, the local router being in operable communication with the AECM and the environment monitoring system via the first switch, the local router being in operable communication with at least one Vehicle ECM of the plurality of Vehicle ECMs via the second switch, the local router being configured to receive and transmit the input control signals from the local transceiver to the AECM,
the first switch being in operable communication with the AECM and the environment monitoring system,
the second switch being in operable communication with the at least one vehicle ECM; and
a first Controller Area Network (CAN) disposed on the machine, the AECM and the at least one Vehicle ECM being in operative communication via the first CAN,
the AECM being disposed on the machine and being configured to:
receive the input control signals from the local router;
generate output control signals based on the input control signals; and
transmit the output control signals to at least one of the Vehicle ECMs, wherein the output control signals control an operation of the machine,
the environment monitoring system including a plurality of Internet Protocol (IP) cameras, a microphone and a plurality of Laser Detection and Ranging Systems (LADARS) disposed on the machine, each IP camera of the plurality of IP cameras being configured to transmit video data in a video stream to the local transceiver via the first switch and the router, the microphone being configured to capture audio data, and the LADARS being configured to transmit positioning data of the machine to the local transceiver via the first switch and the router, wherein the video stream from one IP camera of the plurality of IP cameras includes the audio data captured by the microphone,
the RSM being disposed on the machine and being configured to receive a safety control signal from off-board the machine,
the MAS being configured to operate advanced machine control features concurrently with execution of the input control signals received from off-board the machine.

2. The MAS of claim 1, in which the plurality of Vehicle ECMs includes a machine ECM, a transmission ECM, an implement ECM, an engine ECM, an aftertreatment ECM, and a Heating, Ventilation, and Air Conditioning (HVAC) ECM,
the machine EMC being configured to generate control signals that control movement of the machine,
the transmission ECM being configured to control operation of a transmission disposed on the machine,
the implement ECM being configured to control movement of the implement,
the engine ECM being configured to control operation of an engine disposed on the machine,
the aftertreatment ECM being configured to control machine emissions, and
the HVAC ECM being configured to control operation of heating, ventilation or air conditioning of the machine.

3. The MAS of claim 2, wherein the AECM, the machine ECM, the transmission ECM, and the implement ECM are in operative communication via the Ethernet LAN.

4. The MAS of claim 2, wherein the AECM and a positioning system are in operative communication via the Ethernet LAN, the positioning system being configured to communicate fleet information off-board the machine.

5. The MAS of claim 4, wherein the local router is in operable communication with the positioning system via the second switch.

6. The MAS of claim 2, wherein at least one communication channel of the plurality of communication channels is disposed between the machine ECM and the transmission ECM, and another communication channel of the plurality of communication channels is disposed between the transmission ECM and the implement ECM.

7. The MAS of claim 2, further comprising a second CAN disposed on the machine, the second CAN including a plurality of segments,
 a first segment of the plurality of segments operatively connecting the AECM and the machine ECM,
 a second segment of the plurality of segments operatively connecting the engine ECM and the aftertreatment ECM,
 a third segment of the plurality of segments operatively connecting the transmission ECM and the implement ECM.

8. The MAS of claim 1, wherein the local transceiver is configured to receive the input control signals from a Remote Operator Station (ROS) ECM disposed off-board and remotely from the machine.

9. A method for controlling operation of a machine that includes an implement, the method comprising:
 receiving, by a local transceiver, an input control signal from off-board the machine, wherein the local transceiver is a wireless radio;
 transmitting the input control signal over an Ethernet Local Area Network (LAN), by the local transceiver, to a local router;
 transmitting the input control signal over the Ethernet LAN, by the local router, to an Autonomy Electronic Control Module (AECM);
 processing the input control signal by the AECM;
 transmitting an output control signal, based on a result of the processing the input control signal by the AECM, to a machine Electronic Control Module (ECM) to control the operation of the machine; and
 shutting down the machine when a safety control signal ceases to be received by the machine ECM and a transmission ECM, the transmission ECM being disposed on the machine,
 wherein the local transceiver, the Ethernet LAN, the local router, the AECM, and the machine ECM are disposed on the machine.

10. The method of claim 9, wherein the output control signal is transmitted to the machine ECM via the Ethernet LAN.

11. The method of claim 9, wherein the output control signal is transmitted to the machine ECM via a first Control Area Network (CAN).

12. A control system for a machine that includes an implement, the control system comprising:
 a Machine Automation System (MAS) that includes:
  a plurality of Vehicle Electronic Control Modules (ECMs) disposed on the machine, the plurality of Vehicle ECMs including a machine ECM, a transmission ECM, an implement ECM, and an engine ECM;
  a local transceiver disposed on the machine and configured to receive input control signals from an off-board system, the input control signals being based on operator input;
  an Ethernet Local Area Network disposed on the machine and configured to operatively connect an Autonomy Electronic Control Module, at least some ECMs of the plurality of Vehicle ECMs, a first display, a Remote Shutdown Module (RSM), an environment monitoring system, and the local transceiver, the Ethernet LAN including:
   a plurality of communication channels configured to transfer data between two points;
   a local router disposed on the machine and in operable communication with the local transceiver, a first switch, the RSM, and a second switch,
   the local router being in operable communication with the AECM and the environment monitoring system via the first switch,
   the local router being in operable communication with the machine ECM and the first display via the second switch,
   the local router being configured to receive and transmit the input control signals from the local transceiver to the AECM,
   the first switch being in operable communication with the AECM and the environment monitoring system, and
   the second switch being in operable communication with the machine ECM and the first display;
  a first CAN disposed on the machine and configured to enable operative communication between the AECM, the machine ECM, the transmission ECM, the implement ECM, the Engine ECM, and the first display;
 the AECM being disposed on the machine and in operable communication with the plurality of Vehicle ECMs, the AECM being configured to:
  receive from the local router the input control signals, the input control signals being generated by a Remote Operator Station (ROS) ECM;
  generate output control signals based on the input control signals; and
  transmit the output control signals to the machine ECM, wherein the output control signals control movement of the machine;
 the environment monitoring system including a plurality of Internet Protocol (IP) cameras, each IP camera being configured to capture video data;
 the RSM being disposed on the machine and being configured to receive a safety control signal from off-board the machine; and
 an off-board system that includes:
  a first input device and a second input device located remote from the machine; and
  a first interface device configured to display video data captured by at least one of the IP cameras;
 the ROS ECM being disposed remotely from the machine and in communication with the first input device and the second input device, the ROS ECM being configured to:
  receive input from the first input device or the second input device; and
  transmit the input control signals, based on the received input, to the AECM for control of the operation of the machine, the MAS being configured to operate advanced machine control features on the machine concurrently with execution of the input control signals received from the ROS ECM.

13. The control system of claim 12, further including a second CAN disposed on the machine, the second CAN including a plurality of segments, a first segment of the plurality of segments being operatively connecting the AECM and the machine ECM.

14. The control system of claim 12, wherein each IP camera of the plurality of IP cameras is configured to transmit video data in a video stream to the local transceiver via the first switch and the router.

15. The control system of claim 14, in which the environment monitoring system further comprises a microphone and a plurality of Laser Detection and Ranging Systems (LADARs) disposed on the machine,
the microphone being configured to capture audio data,
the LADARs being configured to transmit positioning data of the machine to the local transceiver via the first switch and the router,
wherein the video stream from one IP camera of the plurality of IP cameras includes the audio data captured by the microphone.

16. The control system of claim 12, in which the local transceiver wirelessly transmits data from the AECM to the ROS ECM.

17. The control system of claim 12, wherein the off-board system further includes a Line of Sight (LOS) operator console, and the MAS further includes a LOS transceiver, wherein control signals generated by the LOS operator console are transmitted to the machine ECM via the LOS transceiver.

18. The control system of claim 15, in which the MAS further includes a machine strobe light assembly disposed on the machine.

19. The control system of claim 18, wherein the machine strobe light assembly is illuminated based on a mode in which the machine is operating.

* * * * *